Figure 1:
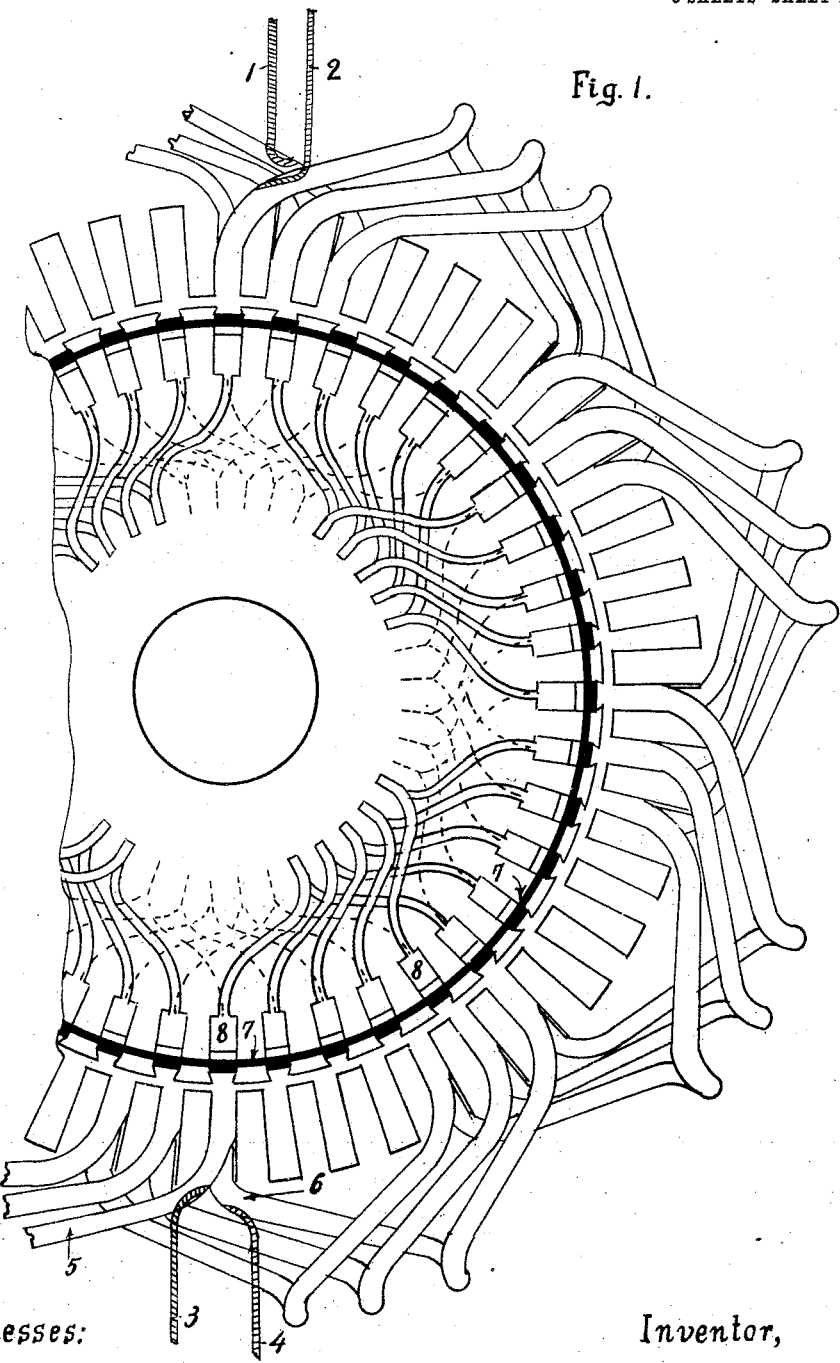

No. 854,296. PATENTED MAY 21, 1907.
F. M. LEWIS.
ELECTROMOTOR OF THE INDUCTION TYPE.
APPLICATION FILED NOV. 21, 1904.

3 SHEETS—SHEET 1.

Witnesses:
F. T. Chapman.
C. E. Marshall

Inventor,
Frank M. Lewis,
By Lyon & Bissing.
Attorneys.

No. 854,296. PATENTED MAY 21, 1907.
F. M. LEWIS.
ELECTROMOTOR OF THE INDUCTION TYPE.
APPLICATION FILED NOV. 21, 1904.

3 SHEETS—SHEET 2.

Witnesses:
F. T. Chapman
C. C. Marshall

Inventor,
Frank M. Lewis,
By Lyons & Bissing
Attorneys.

No. 854,296. PATENTED MAY 21, 1907.
F. M. LEWIS.
ELECTROMOTOR OF THE INDUCTION TYPE.
APPLICATION FILED NOV. 21, 1904.
3 SHEETS—SHEET 3.
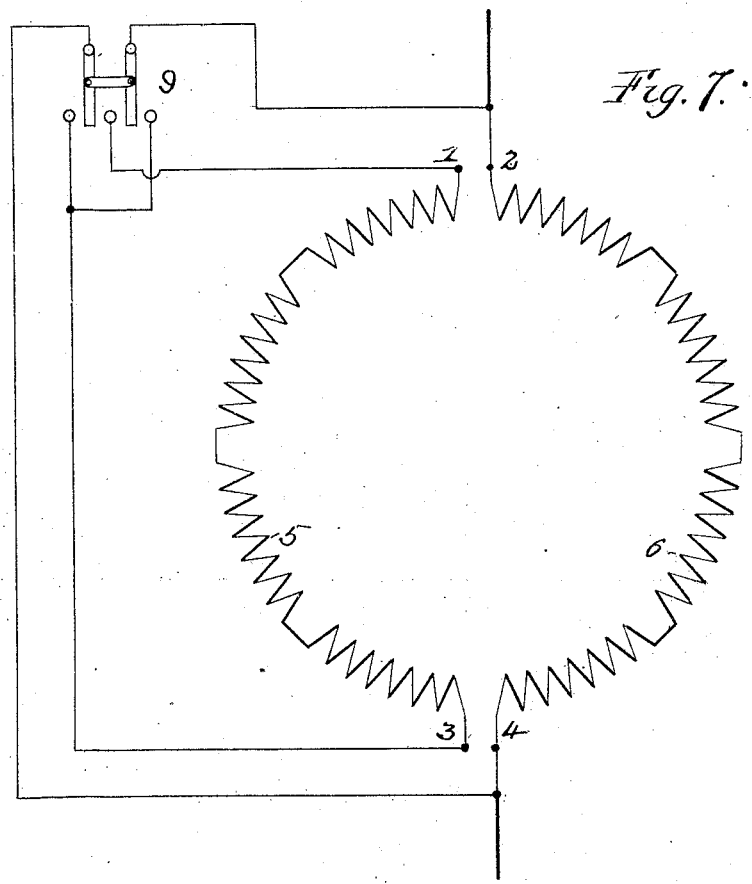
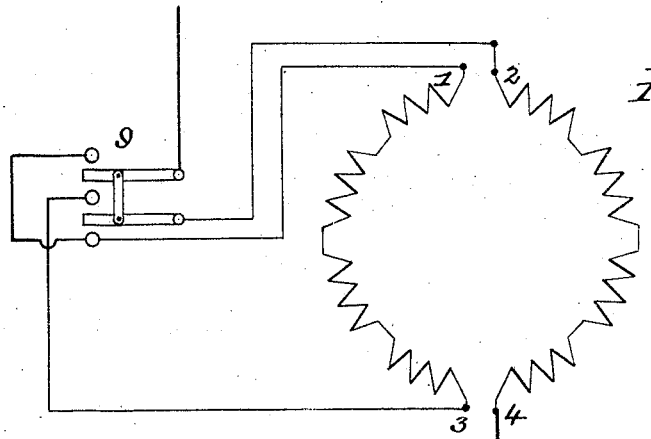
Witnesses:
G. T. Chapman
C. E. Marshall
Inventor:
Frank M. Lewis,
By Lyons & Rising,
Attorneys.

UNITED STATES PATENT OFFICE.

FRANK MICHAEL LEWIS, OF BRIGHTON, ENGLAND.

ELECTROMOTOR OF THE INDUCTION TYPE.

No. 854,296.　　　Specification of Letters Patent.　　　Patented May 21, 1907.

Application filed November 21, 1904. Serial No. 233,629.

*To all whom it may concern:*

Be it known that I, FRANK MICHAEL LEWIS, a subject of the King of Great Britain, and a resident of No. 2 Prestonville Terrace, Brighton, England, have invented certain new and useful Improvements in Electromotors of the Induction Type, of which the following is a specification.

My invention relates to electro-motors of the induction type by means of which certain advantages are obtained.

In so far as the stator is concerned I render the poles capable of reversal throughout one half of the field so that the polarity of the poles of one half shall be different when the machine is starting from what it is when the machine is running. Thus assuming that we have an eight-pole machine the polarity of the poles being when the stator is arranged for running N, S, N, S, N, S, N, S, when I desire to arrange the poles for starting purposes I reverse the polarity of the poles on one half of the field so that the poles are now N, S, N, S, S, N, S, N, It will be obvious that there is not really such polarity in the case of alternating currents and that in so speaking I am merely employing the ordinary language of convenience and which assumes what would be the polarity if a continuous current happened to be passing at the moment.

In so far as the rotor is concerned it has two windings (or sets of windings) one of high resistance and one of low resistance, each of these windings (or sets of windings) being independent and short-circuited on itself and the whole being such that when used with a stator as above mentioned that winding (or set of windings) is selected for the passage of the current which corresponds with the state of polarity of the stator poles for the time being.

I prefer to make the high resistance winding (or set of windings) of my rotor either of the "squirrel-cage" type or of a succession of short-circuited loops of a pitch corresponding with the number of poles of the stator.

In speaking of the polar changes it is to be understood that I mean polar changes for each phase.

In order that my invention may be more readily understood I shall now proceed to describe it with reference to the accompanying drawings in which:—

Figure 6:
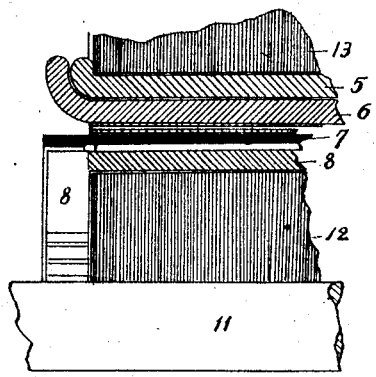
Figure 5:
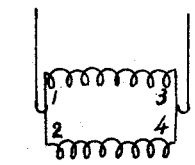
Figure 4:
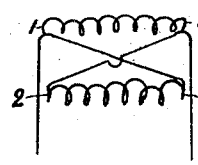
Figure 2:
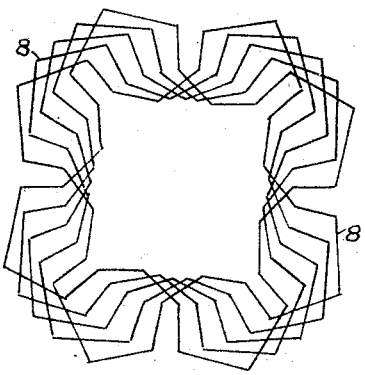
Figure 3:
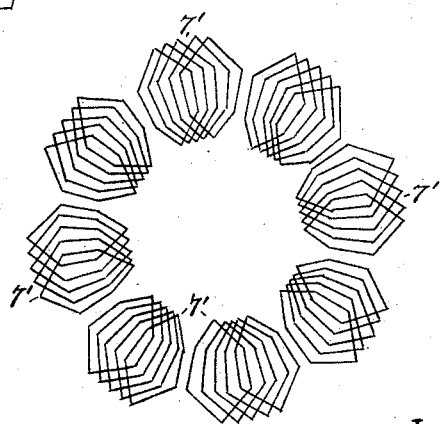

Figure 1 illustrates an eight-pole machine constructed in accordance with my invention. Fig. 2 illustrates the low resistance winding displayed or developed. Fig. 3 illustrates an alternative high resistance winding. Fig. 4 is a diagram illustrating the connections at starting. Fig. 5 is a diagram illustrating the connections when running. Fig. 6 is a section of a part of the machine illustrated in Fig. 1. Fig. 7 is a diagram showing the means for changing the connections of the stator winding when the two halves of the same are in multiple, and Fig. 8 is a diagram showing means for changing the connections of the stator winding when the two halves of the same are in series.

Fig. 1 shows an eight-pole machine. As will be seen this machine is designed for two phase working but I show the winding of one phase only. The winding for the other phase would be the same but would be wound in the slots which are shown as unoccupied in the figure. As will be readily understood the machine could equally well be designed for single phase or any other number of phases. I may adopt any convenient winding for the stator but I prefer the known form of winding which I have illustrated. The more ordinary winding is not so suitable as the magnetic leakage is apt to form subsidiary poles when the machine is in its starting position. Each slot in the stator contains two coils 5 and 6. These coils pass from the same slot to different slots one in one direction and the other in the other direction, that is to say one passing to the right and the other to the left. These coils are preferably former-wound and arranged on the Eickemeyer system. The rotor, as has been stated is provided with two windings (or sets of windings) one of these windings 7 is a high resistance winding of the squirrel cage type and the other consists of a succession of wave or continuous windings 8, 8, of the same polar pitch as the stator and of low resistance. The dotted lines corresponding with the windings 8, 8, represent the positions of these windings at the back of the machine. In Fig. 2 I show this low resistance winding displayed or developed.

In Fig. 3 I show an alternative winding 7' of high resistance which I may employ instead of the squirrel cage winding. This alternative winding is also shown displayed or developed and each loop must be of a polar pitch corresponding with the stator.

It will be seen from the foregoing that the high resistance winding of the rotor is such that each short-circuited loop is at any given moment subjected to the inductive influence of that part of the magnetic flux only which prevails at the point where the loop happens to be, while the low resistance continuous winding is at all times subjected to the inductive influence of the whole magnetic flux.

The action is as follows:—Assuming that I wish to start the machine and that the polarity of the stator is N, S, N, S, N, S, N, S, I now, by means of a hand switch 9 or otherwise, change the polarity to N, S, N, S, S, N, S, N, On switching on the primary current no secondary current will flow through the low resistance wave winding or set of windings 8 as the pressure in the one half of it opposes the pressure in the other half but it will flow through the squirrel cage or high resistance winding or set of windings. The machine will run and when it has attained speed the connections are changed back to N, S, N, S, N, S, N, S, The current now flows through the low resistance winding or set of windings and but little current flows through the high resistance winding or set of windings and the machine will now run in its normal manner.

Figs. 4 and 5 illustrate diagrammatically the reversal of one half of each phase of the stator, Fig. 4 illustrating the connections at starting and Fig. 5 the connections when running. The letters of reference 1, 2, 3, 4, correspond with the leads 1, 2, 3, 4, shown in Fig. 1. In that figure namely Fig. 1, the wires 1, 2, 3, 4, are led out from the former-wound bunches of wires of the stator as shown in said Fig. 1.

In Fig. 6 I show in section a part of a machine illustrating the preferred construction. In this figure which is an enlargement of part of Fig. 1, 11 is the shaft of the rotor, 12 is the laminæ of the rotor, 8 the low resistance rotor winding, 7 the high resistance squirrel cage winding, 6 and 5 sections of the stator coils, and 13 the laminæ of the stator.

It is to be noted that in a machine constructed under my invention the angular velocity of the rotating field remains constant which ever may be the state of the two states of the polarity of the poles.

What I do claim as my invention, and desire to secure by Letters Patent, is:—

1. An induction motor having a rotor provided with two sets of windings, one composed of locally short-circuited loops of high resistance and the other of short-circuited continuous windings of low resistance, and a multipolar field magnet provided with means for reversing the regular succession of poles in one-half of the field for starting the motor, and for reëstablishing the regular succession of poles for the running condition of the motor, substantially as described.

2. A multipolar induction motor having a field winding provided with means for reversing the regular succession of poles in one-half of the field structure, and an armature having two sets of windings, one a high resistance squirrel-cage and the other composed of short-circuited continuous windings of low resistance, substantially as described.

In testimony whereof I have signed my name to this specification in the presence of two witnesses.

FRANK MICHAEL LEWIS.

Witnesses:
TERRY W. SMITH,
KARL VOSSLOH.